United States Patent
Bindloss et al.

(10) Patent No.: US 10,691,451 B2
(45) Date of Patent: Jun. 23, 2020

(54) PROCESSOR INSTRUCTIONS TO ACCELERATE FEC ENCODING AND DECODING

(71) Applicant: COHERENT LOGIX, INCORPORATED, Austin, TX (US)

(72) Inventors: Keith M. Bindloss, Irvine, CA (US); Carl S. Dobbs, Austin, TX (US); Evgeny Mezhibovsky, Waterloo (CA); Zahir Raza, Waterloo (CA); Kevin A. Shelby, Austin, TX (US)

(73) Assignee: COHERENT LOGIX, INCORPORATED, Austin, TX (US)

( * ) Notice: Subject to any disclaimer, the term of this patent is extended or adjusted under 35 U.S.C. 154(b) by 150 days.

(21) Appl. No.: 15/390,910

(22) Filed: Dec. 27, 2016

(65) Prior Publication Data

US 2017/0185399 A1    Jun. 29, 2017

Related U.S. Application Data

(60) Provisional application No. 62/271,578, filed on Dec. 28, 2015.

(51) Int. Cl.
G06F 9/30 (2018.01)
G06F 17/18 (2006.01)
G06F 9/38 (2018.01)

(52) U.S. Cl.
CPC .......... *G06F 9/3001* (2013.01); *G06F 9/3004* (2013.01); *G06F 9/30021* (2013.01);
(Continued)

(58) Field of Classification Search
CPC .............. G06F 9/3001; G06F 9/30065; G06F 9/30098; G06F 9/3885; G06F 9/3869; G06F 9/30036
(Continued)

(56) References Cited

U.S. PATENT DOCUMENTS 4,589,067 A    5/1986    Porter et al.
7,937,559 B1    5/2011    Parameswar et al.
(Continued)

OTHER PUBLICATIONS

Shen et al., Modern Processor Design, McGraw-Hill, Beta Edition 2002, selected pages. (Year: 2002).*
(Continued)

*Primary Examiner* — Michael J Metzger
(74) *Attorney, Agent, or Firm* — Kowert, Hood, Munyon, Rankin & Goetzel, P.C.; Jeffrey C. Hood

(57) ABSTRACT

Various embodiments are described of a system for improved processor instructions for a software-configurable processing element. In particular, various embodiments are described which accelerate functions useful for FEC encoding and decoding. In particular, the processing element may be configured to implement one or more instances of the relevant functions in response to receiving one of the processor instructions. The processing element may later be reconfigured to implement a different function in response to receiving a different one of the processor instructions. Each of the disclosed processor instructions may be implemented repeatedly by the processing element to repeatedly perform one or more instances of the relevant functions with a throughput approaching one or more solutions per clock cycle.

20 Claims, 8 Drawing Sheets

(52) U.S. Cl.
CPC ...... *G06F 9/30036* (2013.01); *G06F 9/30065* (2013.01); *G06F 9/30098* (2013.01); *G06F 9/3867* (2013.01); *G06F 9/3869* (2013.01); *G06F 9/3885* (2013.01); *G06F 9/3887* (2013.01); *G06F 9/3893* (2013.01); *G06F 17/18* (2013.01)

(58) Field of Classification Search
USPC .................................... 712/19, 18, 11, 16
See application file for complete search history.

(56) References Cited

U.S. PATENT DOCUMENTS

| | | | | |
|---|---|---|---|---|
| 2003/0229843 | A1* | 12/2003 | Yu ...................... | H03M 13/1111 714/794 |
| 2008/0281897 | A1 | 11/2008 | Messinger | |
| 2012/0216012 | A1* | 8/2012 | Vorbach ................. | G06F 8/443 712/11 |
| 2014/0351551 | A1 | 11/2014 | Doerr et al. | |

OTHER PUBLICATIONS

Robert G. Gallager; "Low-Density Parity-Check Codes"; M.I.T. Press; Jul. 15, 1963; 90 pages.

Erdal Arikan; "Channel polarization: a method for constructing capacity-achieving codes for symmetric binary-input memoryless channels"; Jul. 20, 2009; 23 pages.

Leroux et. al.; "Hardware Implementation of Successive-Cancellation Decoders for Polar Codes"; Dec. 2012; 10 pages.

Darabiha el al.; "A Bit-Serial Approximate Min-Sum LDPC Decoder and FPGA Implementation"; May 21-24, 2006; 4 pages.

International Search Report and Written Opinion for International Application No. PCT/US2016/068692, dated May 29, 2017, 19 pages.

Second Written Opinion for International Application No. PCT/US2016/068692, dated Jan. 4, 2018, 13 pages.

\* cited by examiner

PROCESSOR INSTRUCTIONS TO ACCELERATE FEC ENCODING AND DECODING

PRIORITY CLAIM

This application claims benefit of priority to U.S. Application No. 62/271,578 titled "Processor Instructions to Accelerate FEC Encoding and Decoding", filed on Dec. 28, 2015, by Keith M. Bindloss et al., which is hereby incorporated by reference as though fully and completely set forth herein.

FIELD OF THE INVENTION

The field of the invention generally relates to processor instructions in a software-configurable processing element.

DESCRIPTION OF THE RELATED ART

Forward Error Correction (FEC) is a popular method to minimize errors in a wireless, wired or any other communication channel. FEC could be implemented by a FEC Encoder on transmit side of the channel and FEC Decoder on the receive side of the communication channel. Many FEC encoding and decoding methods require significant computation and, at the same time, need to be performed in "real-time", i.e. sustain communication speeds required for a chosen application.

FEC may be performed using codes, where input data is encoded into a codeword and transmitted to a receiver that decodes the received codeword and outputs the result as recovered input data. Examples of FEC codes are Low-Density Parity-Check codes (LDPC) and Polar codes, among others.

FEC Encoder and Decoder implementation may consist of series of basic computational operations performed many times on series of numerical data. Accelerating these basic operations is beneficial for real-time nature of Encoder and Decoder. Accordingly, improvements in the field are desired.

SUMMARY OF THE EMBODIMENTS

Various embodiments are described of a system and method for improved processor instructions for a software-configurable processing element. In particular, various embodiments are described which accelerate functions useful for FEC encoding and decoding.

In a first embodiment, a processing element may include a dual data-processing pathway configured to execute a first instruction that specifies a first input operand and a second input operand. In executing the first instruction, the processing element may be configured to: determine an absolute value and a sign function of the first input operand; determine an absolute value and a sign function of the second input operand; determine a minimum magnitude value comprising a minimum of the absolute value of the first input operand and the absolute value of the second input operand; determine a final sign function comprising a product of the sign function of the first input value and the sign function of the second input value; and apply the final sign function to the minimum magnitude value, wherein the result of applying the final sign function to the minimum magnitude value constitutes a result value for the first input operand and the second input operand.

In some scenarios, the first instruction may specify the first input operand by specifying a memory location at which the first input operand is located, and may specify the second input operand by specifying a memory location at which the second input operand is located.

In some scenarios, the first instruction may further specify a plural set of first input operands and a plural set of second input operands, wherein, in executing the first instruction, the processing element is configured to produce a plural set of result values for the plural set of first input operands and the plural set of second input operands.

In some scenarios, the dual data-processing pathway may include a first dual data-processing pathway, and the processing element may further include a second dual data-processing pathway that is configured in the same manner as the first dual data-processing pathway.

In another embodiment, a processing element may include a plurality of pipelined operational stages. Each operational stage may be configurable to perform a plurality of data-processing operations. The processing element is configured to configure the operational stages in response to receiving a first instruction. The processing element may configure a first operational stage to determine an absolute value and a sign function of a first input value, and determine an absolute value and a sign function of a second input value. The processing element may configure a second operational stage to determine a minimum of the absolute value of the first input value and the absolute value of the second input value, and determine a final sign function comprising a product of the sign function of the first input value and the sign function of the second input value. The processing element may configure a third operational stage to apply the final sign function to the minimum of the absolute value of the first input value and the absolute value of the second input value.

In some scenarios, the first operational stage may be configured to determine the absolute value and the sign function of the first input value, and determine the absolute value and the sign function of the second input value during a first clock cycle. The second operational stage may be configured to determine the minimum of the absolute value of the first input value and the absolute value of the second input value, and determine final sign function during a second clock cycle. The third operational stage may be configured to apply the final sign function to the minimum of the absolute value of the first input value and the absolute value of the second input value during a third clock cycle.

In some scenarios, the processing element may be further configured to, in response to receiving the first instruction, sequentially process a plurality of pairs of input values, wherein the first input value and the second input value constitute a first pair of the plurality of pairs of input values, wherein the first operational stage is configured to determine an absolute value and a sign of each input value of a respective pair of input values during each clock cycle of a plurality of consecutive clock cycles.

In some scenarios, the processing element may be further configured to, in response to receiving a second, different instruction, configure at least one operational stage to perform a plurality of data-processing operations other than those configured in response to receiving the first instruction.

In some scenarios, the plurality of pipelined operational stages may include a first plurality of pipelined operational stages, and the processing element may further include a second plurality of pipelined operational stages configured in the same manner as the first plurality of pipelined operational stages.

In some scenarios, configuring an operational stage may include selecting a plurality of data-processing operations to be performed by the operational stage, and selecting registers from which inputs to the selected data-processing operations will be provided.

Another embodiment may include a dual data-processing pathway configured to execute a first instruction that specifies a first input operand including a first operand value and a second operand value, and a second input operand including a third operand value and a fourth operand value. In executing the first instruction, the processing element may be configured to: determine a first signed value by applying a first sign function to the first operand value; determine a second signed value by applying a second sign function to the second operand value; add the first signed value to the third operand value; and add the second signed value to the fourth operand value.

In some scenarios, the first instruction may further specify the first sign function and the second sign function.

In some scenarios, the first instruction may specify the first input operand by specifying a memory location at which the first input operand is located, and may specify the second input operand by specifying a memory location at which the second input operand is located.

In some scenarios, the first instruction may further specify a plural set of first input operands and a plural set of second input operands, wherein, in executing the first instruction, the processing element is configured to produce a plural set of result values for the plural set of first input operands and the plural set of second input operands.

In some scenarios, the processing element may further include a bit-packed register. In executing the first instruction, the processing element may be configured to: store, in the bit-packed register, a plural set of first sign functions corresponding to a plural set of first operand values of the plural set of first input operands; and store, in the bit-packed register, a plural set of second sign functions corresponding to a plural set of second operand values of the plural set of first input operands.

In some scenarios, the dual data-processing pathway may be a first dual data-processing pathway, and the processing element may further include a second dual data-processing pathway, wherein the second dual data-processing pathway is configured in the same manner as the first dual data-processing pathway.

Another embodiment may include a processing element including a dual data-processing pathway configured to execute a first instruction that specifies an input operand including a first operand value and a second operand value, and a sign operand including a first sign function and a second sign function. In executing the first instruction, the processing element may be configured to: apply the first sign function to the first operand value; and apply the second sign function to the second operand value.

In some scenarios, the first instruction may specify the input operand by specifying a memory location at which the input operand is located, and the first instruction may specify the sign operand by specifying a memory location at which the sign operand is located.

In some scenarios, the first instruction may further specify a plural set of input operands and a plural set of sign operands. In executing the first instruction, the processing element may be configured to produce a plural set of result values for the plural set of input operands and the plural set of sign operands.

In some scenarios, the dual data-processing pathway may be a first dual data-processing pathway, and the processing element may further include a second dual data-processing pathway configured in the same manner as the first dual data-processing pathway.

BRIEF DESCRIPTION OF THE DRAWINGS

A better understanding of the present invention can be obtained when the following detailed description of the preferred embodiment is considered in conjunction with the following drawings, in which.

Figure 1:
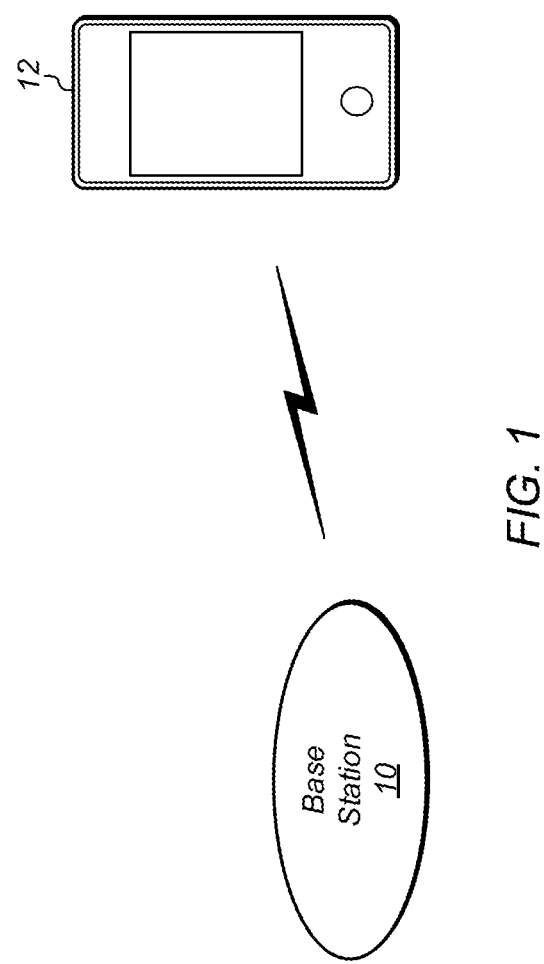
FIG. 1 illustrates an example wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Incorporation by Reference

The following references are hereby incorporated by reference in their entirety as though fully and completely set forth herein:

R. Gallager, "Low-Density Parity-Check Codes," MIT Press, 1963

E. Arikan, "Channel Polarization: A method for constructing capacity achieving codes for symmetric binary-input memoryless channels," *IEEE Trans. on Inf. Theory*, vol. 55, no. 7, pp. 3051-3073, July 2009.

U.S. Pat. No. 7,415,594 titled "Processing System with Interspersed Stall Propagating Processors and Communication Elements" by Doerr et al.

U.S. Pat. No. 8,880,866 titled "Method and system for disabling communication paths in a multiprocessor fabric by setting register values to disable the communication paths specified by a configuration" by Doerr et al.

U.S. Pat. No. 9,430,369 titled "Memory-Network Processor with Programmable Optimizations" by Doerr et al.

U.S. patent application Ser. No. 15/359,845 titled "Memory Management and Path Sort Techniques in a Polar Code Successive Cancellation List Decoder" by Raza et al.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical or optical signals.

Programmable Hardware Element—includes various hardware devices comprising multiple programmable function blocks connected via a programmable or hardwired interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Application Specific Integrated Circuit (ASIC)—this term is intended to have the full breadth of its ordinary meaning. The term ASIC is intended to include an integrated circuit customized for a particular application, rather than a general purpose programmable device, although ASIC may contain programmable processor cores as building blocks. Cell phone cell, MP3 player chip, and many other single-function ICs are examples of ASICs. An ASIC is usually described in a hardware description language such as Verilog or VHDL.

Program—the term "program" is intended to have the full breadth of its ordinary meaning. The term "program" includes 1) a software program which may be stored in a memory and is executable by a processor or 2) a hardware configuration program useable for configuring a programmable hardware element or ASIC.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, e.g., imperative or procedural languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element or ASIC.

Computer System—any of various types of computing or processing systems, including a personal computer system (PC), mainframe computer system, workstation, network appliance, Internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

System Overview

FIG. 1 shows an example communication system involving a base station 10 communicating with a wireless communication device 12. The base station 10 may be a cellular base station which performs cellular communications with a plurality of wireless communication devices. Alternatively, the base station 10 may be a wireless access point for performing Wi-Fi communications, such as according to the 802.11 standard or related standards. The wireless communication device 12 may be any of various devices such as a smart phone, tablet device, computer system, etc. One or both of the base station 10 and the wireless communication device 12 may include decoder logic as described herein.

Figure 2:
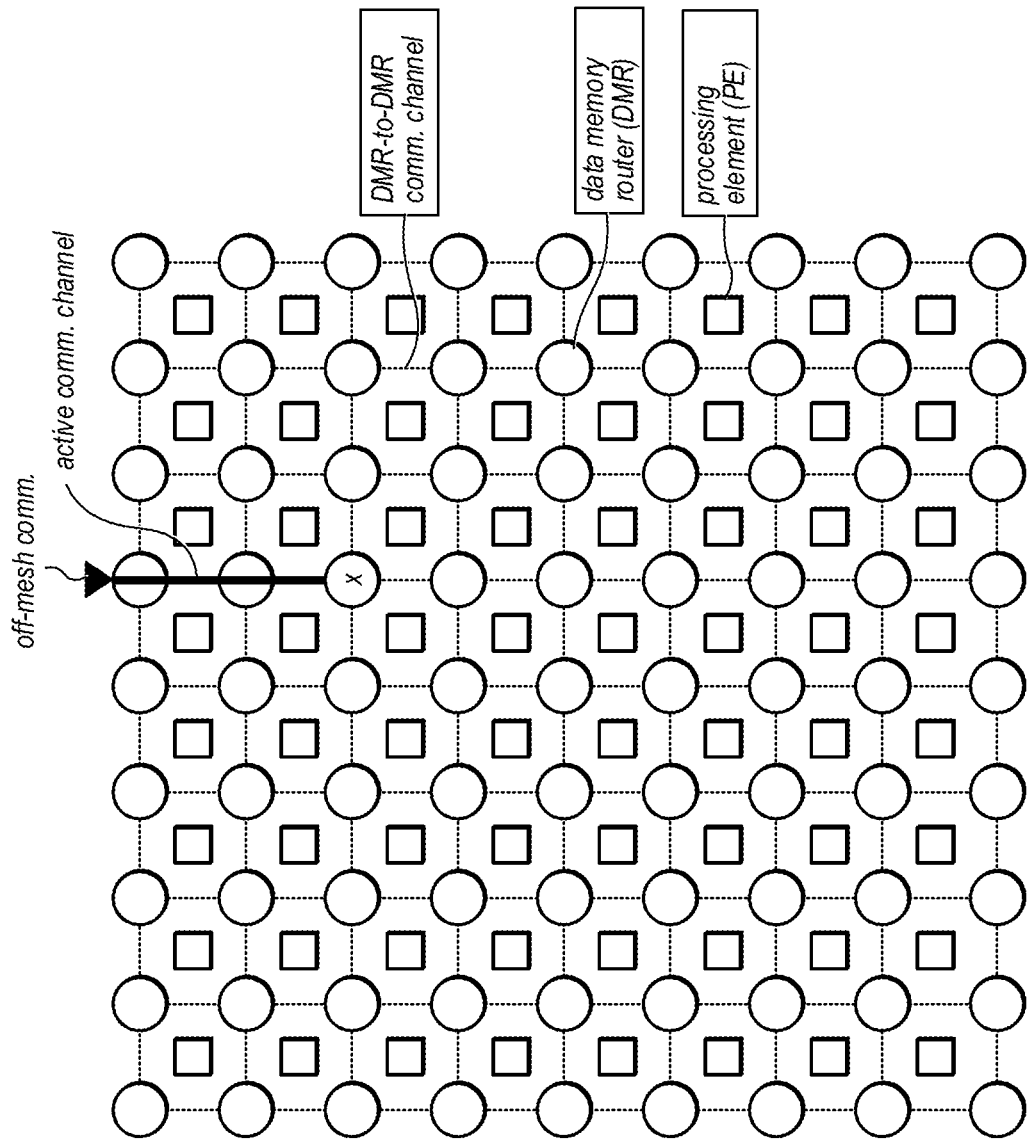
FIG. 2 illustrates an example processor system in a decoder of a device.

FIG. 2 illustrates an example multi-processor system (MPS) that may be contained in one or both of the base station 10 and/or the wireless communication device 12. The MPS may be programmed to implement methods described herein. For more information on example MPS architectures which may be used in some embodiments, please see U.S. Pat. Nos. 7,415,594 and 8,880,866 and 9,430,369, which are incorporated by reference above. Another example of a processor system is a programmable hardware element (PHE), such as an FPGA, which may be configured to implement methods described herein.

In the embodiment illustrated in FIG. 2, the MPS may include a plurality of processor elements (PEs) (shown as rectangles) and a plurality of data memory routers (DMRs) (shown as circles), which may also be referred to as dynamically configurable communicators, or dynamically configurable communication elements, coupled to communicate data and instructions with each other. As used herein, a PE may also be referred to as a PE node, and a DMR may also be referred to as a DMR node.

The MPS may be used in any of various systems and applications where General Purpose Memory Controllers (GPMCs), Digital Signal Processors (DSPs), FPGAs, or ASICs are currently used. Thus, for example, the processing system may be used in any of various types of computer systems or other devices that require computation. In one contemplated embodiment, the processing system is used as a signal processing device in an FEC encoder and/or decoder.

In one embodiment, a PE may include one or more arithmetic-logic units (ALUs) configured for manipulating data, one or more instruction processing units (IPUs) configured for controlling the ALUs, one or more memories configured to hold instructions or data, and multiplexers and decoders of various sorts. Such an embodiment may include a number of ports ("processor ports"), some of which may be configured for connection to DMRs and others that may be configured for connection to other PEs.

In one embodiment, a DMR may include one or more random access memories (RAMs) configured to hold data and instructions, a configurable controller, a network switch such as a crossbar switch, registers, and multiplexers. Such an embodiment may include a plurality of ports, some of which may be configured for connection to PEs (referred to herein as PE-type ports) and others that may be configured to connect to DMRs (referred to herein as DMR-type ports). It is noted that for any given port, whether configured for connection to or from a DMR or PE, the amount of data transferable through such a given port in a particular clock cycle may vary in various embodiments. For example, in one embodiment, a given port may be configured to transfer one word of data per clock cycle, whereas in another embodiment a given port may be configured to transfer multiple words of data per clock cycle. In yet another embodiment, a given port may employ a technique such as time-division multiplexing to transfer one word of data over multiple clock cycles, thereby reducing the number of physical connections comprising the port.

In one embodiment of the MPS, each PE may include a small local memory reserved for instructions and may include very little local data storage. In such an embodiment, DMRs neighboring each PE may be configured to provide operands to a given PE. In a particular embodiment, for many PE instructions a given PE may read operands from neighboring DMRs, execute an ALU operation, and store an ALU result to a given neighboring DMR in one clock cycle. An ALU result from one PE may thereby be made available to several other PEs in the clock cycle immediately following execution. Producing results in this fashion may enable the execution of neighboring PEs to be closely coordinated or "tightly coupled." In other embodiments, each PE may include additional registers for buffering operands and/or result data.

In one embodiment of the MPS, data and instructions may be transferred among the DMRs in one of several different ways. A serial bus may be provided to all memories in the MPS; such a bus may be used to initialize the MPS from external memory or to support testing of MPS data structures. For short-distance transfers, a given PE may be programmed to directly move data to or from its neighbor DMRs. To transfer data or instructions over longer distances, communication pathways may be dynamically created and destroyed in the network of DMRs. For the purpose of such longer-distance data transfer, a network of interconnected DMRs within the MPS may constitute a switched routing fabric (SRF) for communication pathways.

To prevent potential loss of data words on a pathway, an embodiment of MPS 10 may implement flow control between receivers and transmitters along the pathway. Flow control refers to a mechanism that may stop a transmitter if its corresponding receiver can no longer receive data, and may restart a transmitter when its corresponding receiver becomes ready to receive data. Because stopping and restarting the flow of data on a pathway has many similarities to stopping and restarting the progress of a message in wormhole routing, the two may be combined in an integrated scheme.

In one embodiment, the MPS may include pluralities of PEs and DMRs, which PEs may be identical and which DMRs may be identical, connected together in a uniform array. In a uniform array, the majority of PEs may be identical and each of a majority of PEs may have the same number of connections to DMRs. Also, in a uniform array, the majority of DMRs may be identical and each of a majority of DMRs may have the same number of connections to other DMRs and to PEs. The PEs and DMRs in one MPS embodiment may be interspersed in a substantially homogeneous fashion. As used herein, a substantially homogeneous interspersion refers to an arrangement in which the ratio of PEs to DMRs is consistent across a majority of sub-regions of an array.

A uniform array arranged in a substantially homogeneous fashion may have certain advantageous characteristics, such as providing a predictable interconnection pattern and enabling software modules to be re-used across the array. In one embodiment, a uniform array may enable a small number of instances of PEs and DMRs to be designed and tested. A system may then be assembled by fabricating a unit comprising a DMR and a PE and then repeating or "tiling" such a unit multiple times. Such an approach may lower design and test costs through reuse of common system elements.

It is also noted that the configurable nature of the PE and DMR may allow a great variety of non-uniform behavior to be programmed to occur on a physically uniform array. However, in an alternative embodiment, the MPS may also be formed with non-uniform DMR and PE units, which may be connected in a regular or irregular array, or even in a random way. In one embodiment, PE and DMR interconnections may be implemented as circuit traces, for example on an integrated circuit (IC), ceramic substrate, or printed circuit board (PCB). However, in alternative embodiments, such interconnections may be any of a variety of miniature communication links, such as waveguides for electromagnetic energy (i.e., radio or optical energy), wireless (i.e., unguided) energy, particles (such as electron beams), or potentials on molecules, for example.

The MPS may be implemented on a single integrated circuit. In one embodiment, a plurality of MPS integrated circuits may be combined to produce a larger system. However, alternative MPS embodiments are contemplated that include different arrangements of PEs and DMRs.

In some embodiments, the MPS may employ the best features of DSP and FPGA architectures. Like a DSP, the MPS may be a programmable chip with multiple processing units and on-chip memory. However, relative to a DSP, the MPS processing units may be streamlined, there may be more of them, and they may be interconnected in a novel way to maximize the bandwidth of data movement between them as well as data movement on and off the chip. Having more processing units than a DSP may allow the MPS to do more processes per unit time, and streamlined processing units may minimize energy use. Many DSPs with internal parallelism may be bus-oriented architectures. In some embodiments, the MPS may not include a bus, but rather may include neighboring shared local memories, such as in a DMR, embedded in an SRF that may provide significantly higher total bandwidth than a bus-oriented architecture.

Compared to the FPGA approach, some MPS embodiments may be more coarsely grained. For example, in one MPS embodiment, operations may have a natural word length (e.g., 16-bits) and computation may be most efficient if performed using data that is a multiple of the natural word length. In some MPS embodiments, PEs and DMRs may be denser than the equivalent structures realized in FPGA, which may result in shorter average wiring length, lower wiring capacitance and less energy use. In contrast to an FPGA implementation, in some MPS embodiments, every ALU in the MPS may be part of a processor (i.e., a PE), which may facilitate the fetch of operands and the write back of results to surrounding fast memory in the DMRs. Timing and clock skew issues for ALU, fetch, and write back operations may be solved once during the design of the IC chip and need not be re-solved with each new application as is typical of FPGA implementations.

FEC Functions

As noted above, the MPS of FIG. 2 may be used as a signal processing device in an FEC encoder and/or decoder. Various schemes for performing FEC encoding and decoding may involve the following operations:

$$f(x,y) \approx \text{extsign}(x) * \text{extsign}(y) * \min(|x|,|y|) \quad \text{(Equation 1)}$$

$$g(u,x,y) = \text{sat}(-1^u * x + y) \quad \text{(Equation 2)}$$

In equations 1 and 2, each of "x" and "y" are numbers (negative, positive, or zero), while "u" has a value of either zero or one.

The function extsign(a) extracts the sign of "a", which, in some scenarios, may be returned as a result in the set of [−1, 0, +1]. In other scenarios, the result may instead be limited to the set of [−1, +1] or [−1, 0]. In other scenarios, an alternative sign representation may be used.

The function min(a, b) returns the minimum value between the values "a" and "b".

The function sat(a) returns a "saturated" value of "a", based on a pre-defined minimum value "MIN_VAL" and a maximum value "MAX_VAL" (where MIN_VAL<MAX_VAL) as follows:
 if a<MIN_VAL, then sat(a)=MIN_VAL
 if a>MAX_VAL, then sat(a)=MAX_VAL
 if MIN_VAL<=a<=MAX_VAL, then sat(a)=a In some implementations of FEC encoders and decoders, such as Low-Density Parity-Check codes (LDPC) and Polar codes, Equation 1 and Equation 2 may be calculated many times. To preserve real-time encoding/decoding, these calculations must be performed very rapidly. Thus, FEC functions for real-time applications have traditionally been performed in dedicated hardware (e.g., in an ASIC) that is custom designed to provide the throughput necessary for the given real-time application. However, such a custom solution is useful only for the specific application for which it was designed; if the FEC algorithm, the throughput requirements, or any of various other variables change, the dedicated hardware must be redesigned. Additionally, in applications where multiple decoders may be required (e.g., smart phones) a collection of multiple dedicated hardware solutions may be required, which may consume large amounts of space, even while some or all of the decoders are not currently in use.

It is therefore desirable to implement such FEC functions in software-configurable hardware, such as the MPS of FIG. 2. This allows the hardware implementing FEC functions to be reconfigured in response to changes in algorithm or other operational parameters. The hardware may even be reconfigured dynamically, as a particular FEC encoder/decoder is cycled into or out of operation.

Additionally, functions such as those shown in Equation 1 and Equation 2 may be utilized differently in a variety of settings. For example, the functions shown in Equation 1 and Equation 2 may be used in both LDPC and Polar codes. However, if this functionality is embedded within dedicated hardware custom designed for a particular FEC solution, then shared use of the hardware designed for each particular function may not be possible.

It is therefore desirable to implement these functions as a set of machine instructions, such that any available one or more software-configurable processors may implement the functions.

However, the functions of Equation 1 and Equation 2 have traditionally required significant processing time. For example, the function of Equation 1, implemented in a traditional RISC ("Reduced Instruction Set Computer") architecture, may require the execution of 7 RISC operations, typically requiring a processor to spend 7 clock cycles to execute the function.

It is therefore desirable to implement these functions as a set of machine instructions that can be executed in a reduced number of cycles.

As disclosed herein, each one of equations 1 and 2 may be accelerated by one or more processor instructions, e.g., implemented on the MPS of FIG. 2. Although the new instructions are described in the context of a processing element (PE) of the MPS of FIG. 2, the ideas are more generally applicable to other data processing architectures as well, and so the MPS architecture should be understood as an example, and not as a limitation.

Figure 3:
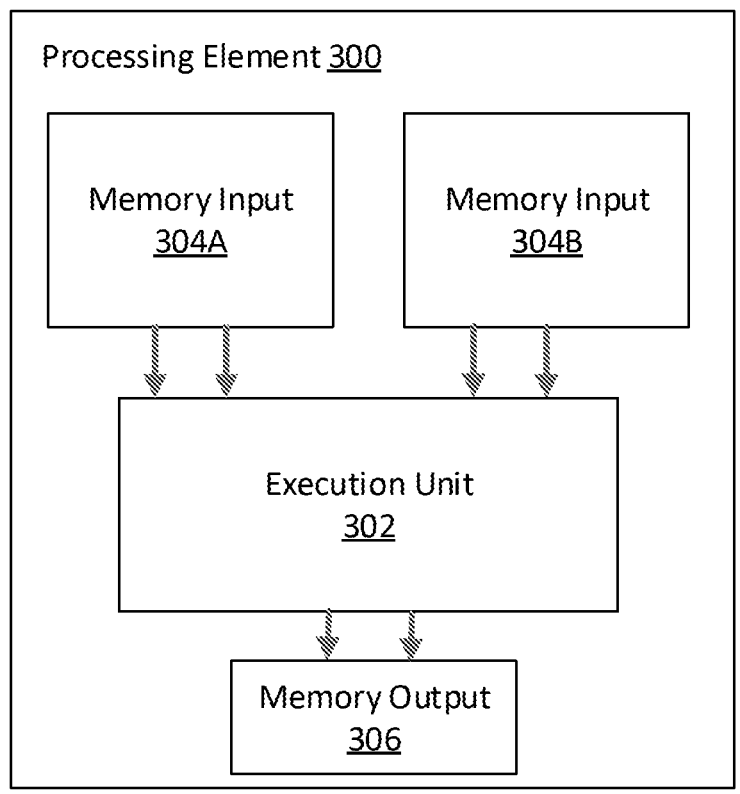
FIG. 3 illustrates a block diagram of a processing element that may be dynamically configured according to any of the disclosed processor instructions.

FIG. 3—Processing Element

FIG. 3 illustrates a block diagram of a processing element 300 (e.g., a PE, as discussed above), according to some embodiments. It should be understood that FIG. 3 is a simplified block diagram, illustrating portions of the processing element that are relevant to the present discussion, and that additional components (not shown) and alternative configurations are also envisioned.

As illustrated, the processing element 300 may include an execution unit 302. The execution unit 302 may be configured to execute one or more instructions, such as computer instructions. The execution unit 302 may include one or more configurable data-processing pathways. For example, the execution unit 302 may include one or more configurable M-width (e.g., dual) data-processing pathways, wherein each M-width data-processing pathway is configured to process a plurality of input operands. The one or more M-width data-processing pathways may be configured in the same manner (e.g., to perform multiple instances of the same instruction), or may be configured independently (e.g., to perform different instructions). As a more specific example, the execution unit 302 may include a plurality of pipelined operational stages, each operational stage configurable to perform one or more data-processing operations.

As illustrated, the processing element 300 may include one or more memory input(s) 304, such as illustrated memory input 304A and memory input 304B. The memory input 304A may include one or more registers or other memory devices configured to store data for use by the execution unit 302 while executing a received instruction. For example, the memory input 304A may receive and store data, e.g., from another processing element or from another memory device, such as a DMR or memory cache, and may provide the stored data to the execution unit 302, e.g., as one or more input operands. The memory input 304B may similarly include one or more registers or other memory devices for storing data for use by the execution unit 302. In some embodiments, each of the memory input 304A and the memory input 304B may provide one or more input operands to the execution unit 302. In other embodiments, the memory input 304A may provide one or more input operands, while the memory input 304B may provide other data to assist in processing the input operands provided by the memory input 304A. In some embodiments, such other data may be loaded into the memory input 304B in advance of beginning processing of the input operands. In some embodiments, memory inputs 304A and 304B may be comprised in a single memory device. Additional memory inputs may be included in some embodiments.

As illustrated, the processing element 300 may include one or more memory output(s) 306. The memory outputs 306 may include one or more registers or other memory devices configured to store data output by the execution unit 302 while executing a received instruction, and for providing the stored data to a destination outside the processing element 300, e.g., to another processing element or to another memory device, such as a DMR or memory cache.

The processing element 300 may further include additional elements (not shown), such as for receiving and parsing an instruction.

The processing element 300 may be configured to receive an instruction (e.g., a single instruction), and in response, to configure the execution unit to execute the received instruction. The instruction may include one or more input operands. For example, the instruction may include one or more input operands by expressly specifying one or more values to use as input operands. Alternatively, or additionally, the instruction may include one or more input operands by specifying, for at least one input operand, a memory location (e.g., a memory address) at which the input operand is located. For example, if executing the instruction requires a first input operand and a second input operand, then the instruction may specify a memory location at which the first input operand is located and a memory location at which the second input operand is located.

In some scenarios, the instruction may cause the processing element 300 to perform a function on one or more input operands, and to repeat the function multiple times, using new input operands each time. Thus, in some scenarios, the instruction may further specify one or more plural sets of input operands. For example, if executing the function requires a first input operand and a second input operand, then the instruction may specify a memory location at which a first set of input operands is located and a memory location at which a second set of input operands is located. The processing element 300 may retrieve a first input operand from the first set and a first input operand from the second set to perform the function a first time, and may retrieve a second input operand from the first set and a second input operand from the second set to perform the function a second time. For example, the first input operand from the first set may be the input operand located at the memory location specified by the instruction for the first set of operands, and the second input operand from the first set may be the input operand located at the next sequential memory location. This pattern may be continued (e.g., with the processing element 300 incrementing through sequential memory locations to retrieve input operands from memory for each set of input operands) until the instruction has been fully implemented.

The instruction may specify, e.g., a number of times to repeat the function, a number of operands in each set, and/or an ending memory location, such that the instruction has been fully implemented when the function has been repeated the specified number of times, the specified number of input operands has been used, and/or the ending memory location has been reached.

Executing the received instruction may include the processing element 300 producing and outputting one or more result values. For example, the processing element 300 may produce a result value each time the function specified by the instruction is performed.

The instruction may specify one or more memory locations to store the one or more result values. For example, if executing the instruction produces only one result value, then the instruction may specify a single memory location indicating a location at which to store the one result value. Alternatively, if executing the instruction produces a plurality of result values, then the instruction may specify a single memory location indicating the starting location of a set of sequential memory locations at which to store the plurality of result values, or the instruction may specify a range of memory locations, or otherwise specify a plurality of memory locations at which to store the plurality of result values.

As one example, the instruction may include an M-width approximated min-sum (MAMINSUM) instruction, which may specify a first input operand and a second input operand. In response to receiving the MAMINSUM instruction, the processing element 300 may perform a MAMINSUM function, which may implement Equation 1. For example, when M=2, performing the MAMINSUM instruction may include: determining an absolute value and a sign function of the first input operand; determining an absolute value and a sign function of the second input operand; determining a minimum magnitude value comprising a minimum of the absolute value of the first input operand and the absolute value of the second input operand; determining a final sign function comprising a product of the sign function of the first input value and the sign function of the second input value; and applying the final sign function to the minimum magnitude value, wherein the result of applying the final sign function to the minimum magnitude value constitutes a result value for the first input operand and the second input operand.

The MAMINSUM instruction may further specify a plural set of first input operands and a plural set of second input operands. In such scenarios, the processing element 300 may, in response to receiving the MAMINSUM instruction, perform the MAMINSUM function a plurality of times, so as to produce a plural set of result values for the plural set of first input operands and the plural set of second input operands. For example, each iteration of the MAMINSUM function may utilize a respective pair of input operands, including a respective first input operand from the plural set of first input operands, and a respective second input operand from the plural set of second input operands.

As another example, the instruction may include an M-width (e.g., dual) add-sign (MADDSIGN) instruction, which may specify a first input operand and a second input operand. For example, if M=2, the first input operand may include a first operand value and a second operand value, and the second input operand may include a third operand value and a fourth operand value. In response to receiving the MADDSIGN instruction, the processing element 300 may perform a MADDSIGN function, which may implement Equation 2. For example, the MADDSIGN function may include: determining a first signed value by applying a first sign function to the first operand value; determining a second signed value by applying a second sign function to the second operand value; adding the first signed value to the third operand value; and adding the second signed value to the fourth operand value. The MADDSIGN instruction may further specify first sign function and the second sign function.

The MADDSIGN instruction may further specify a plural set of first input operands and a plural set of second input operands. In such scenarios, the processing element 300 may, in response to receiving the MADDSIGN instruction, perform the MADDSIGN function a plurality of times, so as to produce a plural set of result values for the plural set of first input operands and the plural set of second input operands. In such scenarios, the MADDSIGN instruction may further specify a plural set of first sign functions corresponding to a plural set of first operand values of the plural set of first input operands, and a plural set of second sign functions corresponding to a plural set of second operand values of the plural set of first input operands. In some scenarios, the processing element 300 may comprise one or more bit-packed registers, and the processing element 300 may load the one or more bit-packed registers with the plural set of first sign functions and the plural set of second sign functions.

As another example, the instruction may include an M-width (e.g., dual) sign (MSIGN) instruction, which may specify an input operand and a sign operand. For example, if M=2, the input operand may include a first operand value and a second operand value, and the sign operand may include a first sign function and a second sign function. In response to receiving the MSIGN instruction, the processing element 300 may perform a MSIGN function, which may implement a portion of Equation 2. For example, the MSIGN function may include: applying the first sign function to the first operand value; and applying the second sign function to the second operand value.

The MSIGN instruction may further specify a plural set of input operands and a plural set of sign operands. In such scenarios, the processing element 300 may, in response to receiving the MSIGN instruction, perform the MSIGN function a plurality of times, so as to produce a plural set of result values for the plural set of input operands and the plural set of sign operands.

Figure 4:
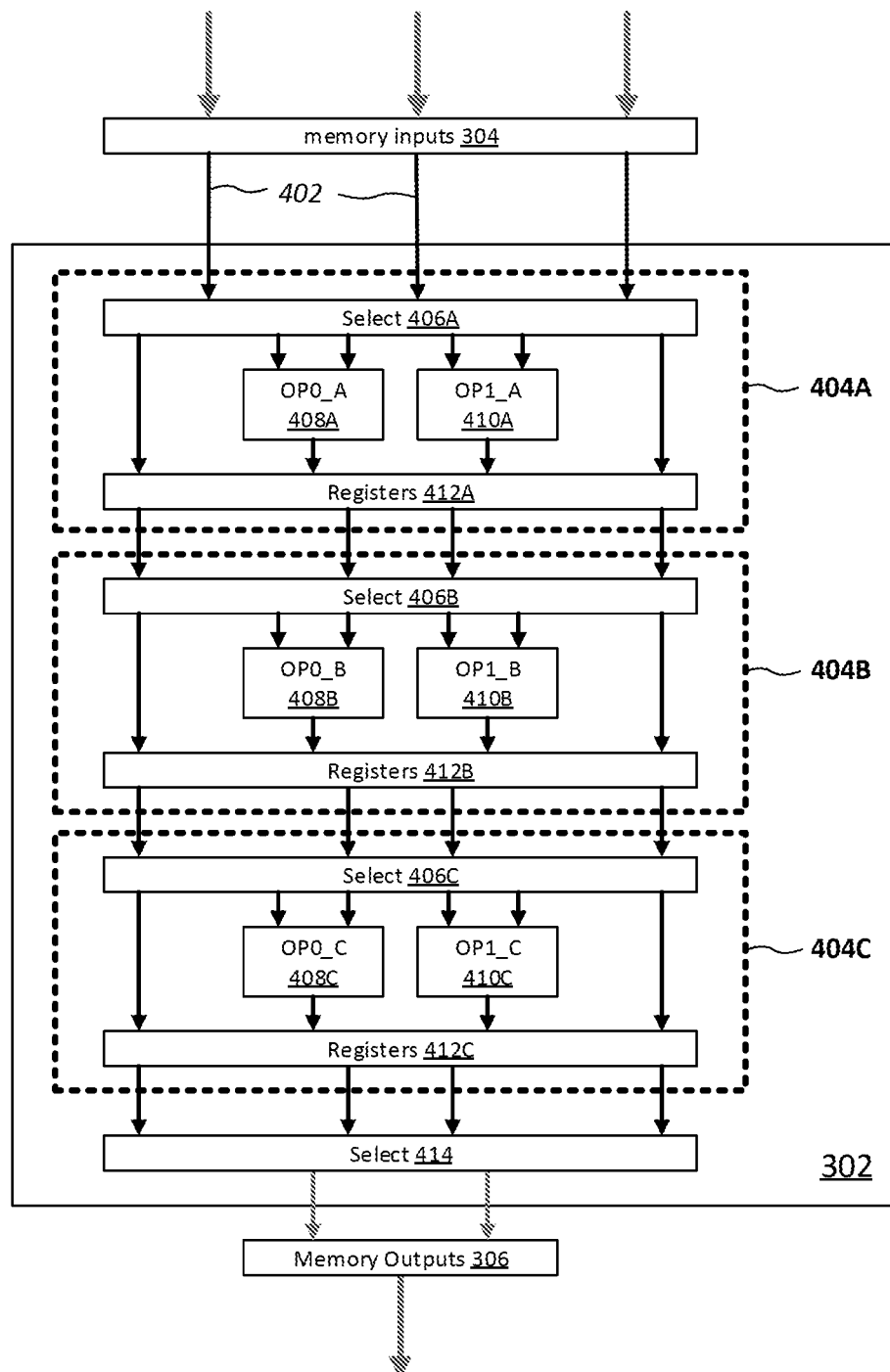
FIG. 4 illustrates a block diagram of an execution unit included in the processing element, which may be configured to execute any of the disclosed processor instructions.

FIG. 4—Execution Unit

FIG. 4 illustrates a block diagram of an execution unit 302, included within the processing element 300, according to some embodiments. It should be understood that FIG. 4 is a simplified block diagram, illustrating portions of the execution unit that are relevant to the present discussion, and that additional components (not shown) and alternative configurations are also envisioned.

As illustrated, the execution unit 302 may include a configurable dual data-processing pathway. It should be understood that the dual (M=2) data-processing pathway embodiment is merely exemplary, and that other embodiments may include a broader (e.g., M=3 or M=4) or narrower (M=1) M-width data-processing pathway. In other embodiments, the execution unit 302 may include a plurality of such M-width data-processing pathways, which may be independently configurable. The M-width data-processing pathway may be configured to process a plurality of input operands 402.

As shown, the dual data-processing pathway includes a plurality of pipelined operational stages (404A-C), each operational stage configurable to perform two (i.e., M) data-processing operations. In other embodiments, one or more of the operational stages may be configurable to perform a larger or smaller number of data-processing operations. Although three operational stages are illustrated in FIG. 4, other numbers of operational stages may be included.

One or more of the operational stages may each include a select module 406, a first operational module 408, a second operational module 410, and one or more registers 412. It should be understood that less or more operational modules may be included for different values of M (other than M=2).

The select module 406 may include one or more multiplexers or other hardware configurable to select between a plurality of inputs, to direct one or more of the inputs to the first operational module 408 and/or the second operational module 410. The select module 406 may be further configurable to bypass the operational modules 408 and 410, to direct one or more of the inputs to the registers 412. For example, the select module 406A of operational stage 404A may be configurable to direct one or more input operand from the memory inputs 304 to the first operational module 408A, to direct one or more input operand to the second operational module 410A, and/or to direct one or more input operand to the one or more registers 412A. Similarly, the select module 406B of operational stage 404B may be configurable to direct one or more outputs of the registers 412A to one or more of the first operational module 408B, the second operational module 410B, and/or the one or more registers 412B.

The first operational module 408 and the second operational module 410 may each be configurable to perform any of a plurality of arithmetic and/or logic operations. For example, an operational module may include one or more of any of an adder, a multiplier, an accumulator, a shifter, a logic unit, an add-compare select (ACS) unit, etc. Thus, each operational module may be configured to perform at least one logical and/or arithmetic function. For example, each operational module may be configurable to perform a function such as a sign function (e.g., SIGN16(a, s)), an addition function (e.g., ADD16(a, b)), an absolute value function (ABS16(a)), a minimum function (MIN(a, b)), a sign multiply function (MULSIGN(a, b)), etc. Each operational module may output a result value to the one or more registers 412. In other embodiments, one or more operational modules may be configured to output a result value directly to some other memory device, such as a neighboring DMR, or to one or more memory outputs 306 (e.g., via a final select module 414).

The one or more registers 412 may receive the result values from the operational modules and/or may receive output from the select module 406. The one or more registers 412 may then output the received values to the next pipeline stage, e.g., on the next clock cycle. Alternatively, the one or more registers may output the received values directly to some other memory device, such as a neighboring DMR, or to the one or more memory outputs 306 (e.g., via a final select module 414). This may allow one or more operational stages to be bypassed, to configure the execution unit 302 to execute an instruction that may be performed using less than all of the operational stages 404.

In some embodiments, each operational module may perform its at least one logical and/or arithmetic function in a clock cycle. Thus, as illustrated in FIG. 4, each operational stage may, in one clock cycle, perform up to two data-processing operations on one or more selected input operands, and may save a result value from one or more of the data-processing operations to the one or more registers 412. On the next clock cycle, the next operational stage in the pipeline may similarly perform up to two data-processing operations on one or more of the saved result values from the preceding operational stage.

In other embodiments, one or more of the operational modules 408 and 410 may be further pipelined, to include smaller functional units and/or internal memory registers. Thus, an operational module may perform a function over the course of multiple clock cycles, e.g., while allowing for a shorter clock period.

The operational stages 404A-C may be configured based on the instruction received by the processing element 300. The operational stages 404A-C may therefore be reconfigured at a later time if a new, different instruction is received by the processing element 300. For example, if the processing element 300 receives a MADDSIGN instruction, then the processing element 300 may configure the operational stages 404 to execute the MADDSIGN instruction, e.g., as described below. If the processing element 300 later receives an MAMINSUM instruction, then the processing element 300 may reconfigure the operational stages 404 to execute the MAMINSUM instruction, e.g., as described below. Configuring an operational stage 404 may include selecting a plurality of data-processing operations to be performed by the operational stage, and selecting registers from which inputs to the selected data-processing operations will be provided.

For example, configuring an operational stage may include configuring at least one of the operational module 408 and the operational module 410 to perform a particular operation. Configuring the operational stage may further include configuring the select module 406 to define which input(s) are provided to each of the operational module 408 and the operational module 410. For example, the select module 406 may be configured to select which registers will serve as input sources to the operational module 408 and the operational module 410. Configuring the operational stage may further include configuring the select module 406 to define where in an operational module the input is sent. For example, if the operational module 408A includes an adder and a multiplier, and if the operational module 408A is configured to perform an addition function, then the select module 406A may be configured to provide two input operands (i.e., the two input operands to be added) from the memory input registers in which they are stored to inputs of the adder of the operational module 408A, rather than to inputs of the multiplier.

If the instruction specifies that the execution unit 302 is to repeat a function multiple times, then each operational stage may perform its operation multiple times; e.g., once per clock cycle. The memory inputs 304 may provide the correct input operands for each repetition of the function. Thus, the execution unit 302 may perform the function multiple times with a throughput of approximately one result per clock cycle (e.g., excluding the latency introduced while processing the first repetition of the function).

Figure 5:
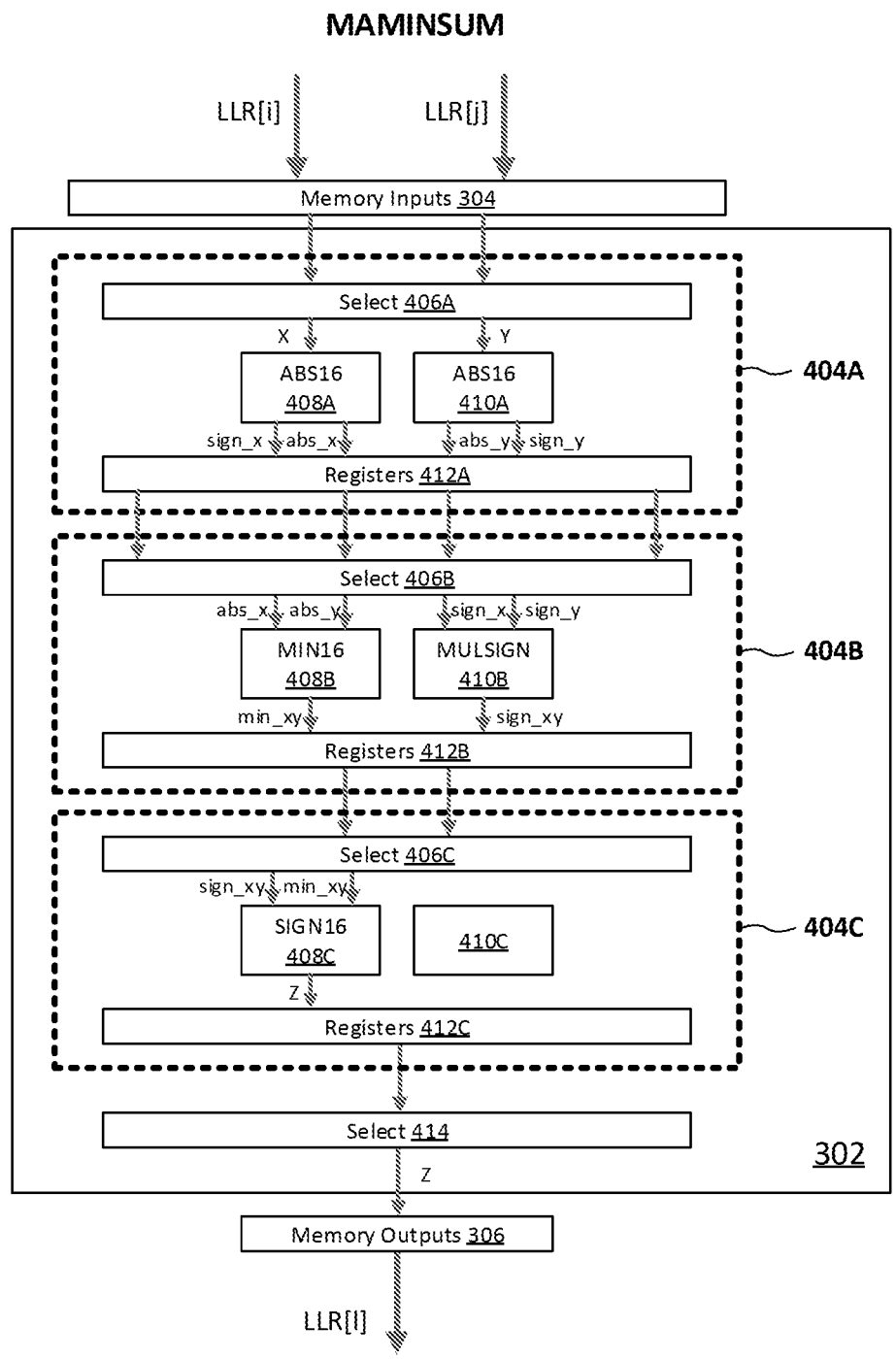
FIG. 5 illustrates a block diagram of the execution unit configured to execute an approximated min-sum instruction.

FIG. 5—Execution Unit Configured for MAMINSUM Instruction

FIG. 5 illustrates an example of the execution unit 302, configured to execute an MAMINSUM instruction, according to some embodiments. Using the MAMINSUM instruction, the execution unit 302 may implement (M/2)*N instances of Equation 1, with a latency of L clock cycles, and a throughput of (M/2)*N/(N+L−1) instances per clock cycle. As illustrated, the MAMINSUM instruction is implemented with a dual data-processing pathway (M=2), such that the execution unit 302 may implement N instances of Equation 1, with a latency of 3 clock cycles, and a throughput of N/(N+2) instances per clock cycle. It should be understood that the dual data-processing pathway embodiment is merely exemplary, and that other embodiments may include additional operational modules in each operational stage to implement additional instances of Equation 1 (e.g., if M>2). It may be noted that, in a traditional RISC architecture, without the MAMINSUM instruction, a similar function may be performed with a latency of 7 clock cycles, and a throughput of ⅐ instances per clock cycles. The processing element 300 may configure the execution unit 302 as shown in FIG. 5 in response to the processing element 300 receiving an MAMINSUM instruction.

The MAMINSUM instruction may specify two input operands (X and Y), or two sets of operands, as discussed above. For example, each input operand may be a 16-bit signed integer value. The two input operands may be specified directly or may be specified by specifying the memory locations at which the two input operands are located. As illustrated, a first input operand (X) is specified as being located at index "i" of an array LLR[ ] in memory, and a second input operand (Y) is specified as being located at index "j" of the array LLR[ ]. In such an implementation, the processing element 300 may sequence through a set of X values stored sequentially in memory and a set of Y values stored sequentially in memory, merely by incrementing the "i" and "j" indices. In some embodiments, the processing element 300 may sequence through a respective pair of X and Y values, e.g., once each clock cycle until all values in the set of X values and the set of Y values have been used. The MAMINSUM instruction may further specify a memory location at which a result value (Z) may be stored.

As illustrated, the select module 406A may be configured to provide the first input operand X to the first operational module 408A, and to provide the second input operand Y to the second operational module 410A.

Each of the operational modules 408A and 410A may be configured to perform an ABS16 function on a respective input operand. The ABS16 function may provide two output values: an absolute value (abs_a) of the input operand and a sign function (sign_a) of the input operand. For example, the absolute value may be a 16-bit integer value. The sign function may be, for example, a 2-bit value representing a value in the set of [−1, 0, +1]. In other scenarios, the sign function may instead be a 1-bit value representing a value in the set of [−1, +1] or a value in the set of [−1, 0]. In yet other scenarios, the sign function may instead be a 16-bit signed integer value with valid values limited to the sets defined above. In other scenarios, an alternative sign representation may be used for the sign function.

The operational module 408A may thus determine an absolute value of X (abs_x) and a sign function of X (sign_x), while the operational module 410A may determine an absolute value of Y (abs_y) and a sign function of Y (sign_y). These outputs may be output to, and stored in, the registers 412A.

Thus, the first operational stage 404A may be configured to determine an absolute value and a sign function of a first input value, and determine an absolute value and a sign function of a second input value. This may be performed, e.g., during a first clock cycle.

As illustrated, the select module 406B may be configured to provide abs_x and abs_y to the operational module 408B, and to provide sign_x and sign_y to the operational module 410B.

The operational module 408B may be configured to determine the minimum of the two inputs; e.g., the minimum of abs_x and abs_y. The operational module 408B may provide an output min_xy, which may be, for example, the one of the two inputs having a smaller value. The output min_xy may be stored in the registers 412B.

The operational module 410B may be configured to determine a final, or combined, sign function (sign_xy). The final sign function sign_xy may include a value representing a product of the sign functions sign_x and sign_y. The final sign function sign_xy may be determined, e.g., by performing a multiplication function on sign_x and sign_y. In other embodiments, because the sign functions sign_x and sign_y may each be only one or two bits, the final sign function sign_xy may be more easily determined using a simple select function that simulates the results of a multiplication function. The final sign function sign_xy may be stored in the registers 412B.

Thus, the second operational stage 404B may be configured to determine a minimum of the absolute value of X and the absolute value of Y, and to determine a final sign function comprising a product of the sign function of X and the sign function of Y. This may be performed, e.g., during a second clock cycle. In some embodiments, the second clock cycle may be the clock cycle immediately following the first clock cycle. In other embodiments, the second clock cycle may occur at a later time.

As illustrated, the select module 406C may be configured to provide min_xy and sign_xy to the operational module 408C. The operational module 410C may not be utilized by the MAMINSUM instruction. Thus, the select module 406C may provide no input, or no meaningful input, to the operational module 410C. Alternatively, the select module 406C may provide an input for another function, e.g., unrelated to the MAMINSUM instruction, to efficiently utilize the untasked operational module 410C.

The operational module 408C may be configured to apply the final sign function sign_xy to min_xy, to provide the output value Z. For example, the final sign function may be applied to min_xy as follows:

if sign_xy>0 (e.g., +1), then Z=min_xy
if sign_xy=0, then Z=0
if sign_xy<0 (e.g., −1), then Z=−min_xy Alternatively, the final sign function may be applied to min_xy as follows:

if sign_xy=−1, then Z=−min_xy
if sign_xy-1, then Z=min_xy

The output value Z may be stored in the registers 412C, or may alternatively be stored to the memory outputs 306 (e.g., via the select module 414) or directly to another memory device, such as a neighboring DMR.

Thus, the third operational stage 404C may be configured to apply the final sign function sign_xy to the minimum of the absolute value of X and the absolute value of Y. This may be performed, e.g., during a third clock cycle. In some embodiments, the third clock cycle may be the clock cycle immediately following the second clock cycle. In other embodiments, the third clock cycle may occur at a later time.

The output value Z may, in some embodiments, be stored in the memory outputs 306, and output to another memory device, such as a neighboring DMR or a memory input register of another processing element. As illustrated, the output value Z is stored at index "1" of the array LLR[ ]. Thus, the processing element 300 may store a set of output values in sequential memory locations, merely by incrementing the "1" index.

Figure 6:
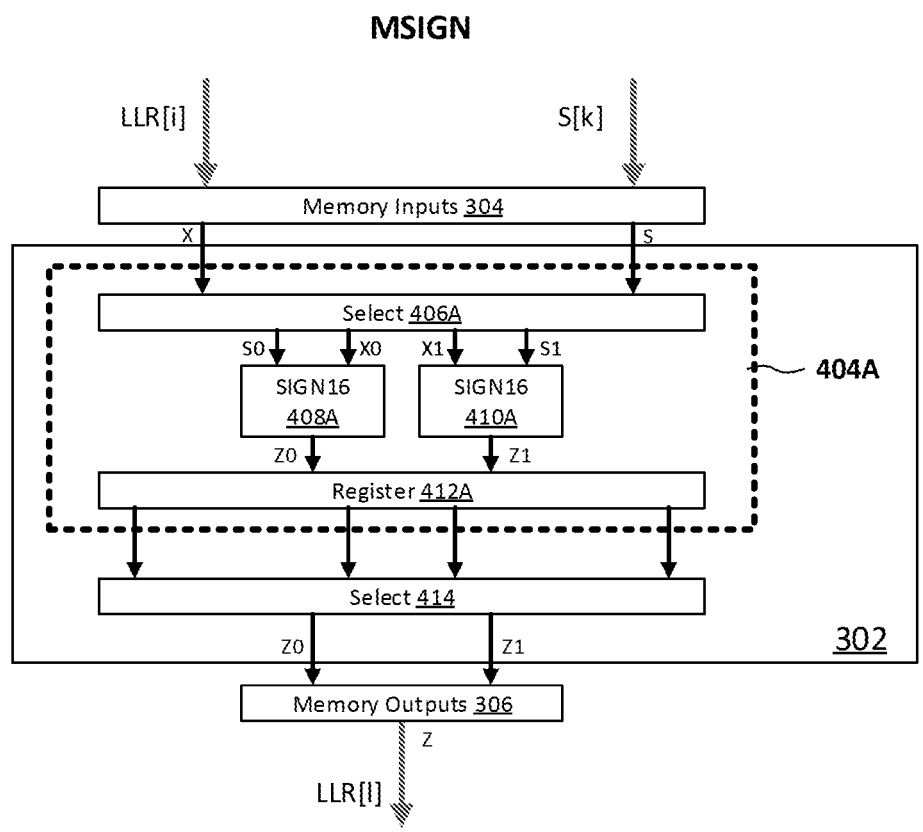
FIG. 6 illustrates a block diagram of the execution unit configured to execute an M-width sign instruction.

FIG. 6—Execution Unit Configured for MSIGN Instruction

FIG. 6 illustrates an example of the execution unit 302, configured to execute an MSIGN instruction, according to some embodiments. Using the MSIGN instruction, the execution unit 302 may implement a portion of M*N instances of Equation 2, with a throughput of M instances per clock cycle. As illustrated, the MSIGN instruction is implemented with a dual data-processing pathway (M=2), such that the execution unit 302 may implement 2N instances of Equation 2, with a throughput of 2 instances per clock cycle. It should be understood that the dual pathway embodiment is merely exemplary, and that other embodiments may include more or less operational modules in each operational stage to implement a different number of instances of Equation 2 (e.g., if M #2). It may be noted that, in a traditional RISC architecture, without the MSIGN instruction, a similar function may be performed with a throughput of ½ instances per clock cycles. The processing element 300 may configure the execution unit 302 as shown in FIG. 6 in response to the processing element 300 receiving a MSIGN instruction.

Equation 2 may be rewritten in the following form:

$$\text{if } u=0, \text{ then } g(u,x,y)=(y+x); \text{ else } g(u,x,y)=(y-x) \qquad \text{(Equation 3)}$$

In Equation 3, "u" has a value of 0 or 1, as in Equation 2. Alternatively, Equation 2 may be rewritten in the following form, where $s=(-1)^u$:

$$\text{if } s<0, \text{ then } g(s,x,y)=(y-x); \text{ else } g(s,x,y)=(y+x) \qquad \text{(Equation 4)}$$

The MSIGN instruction may determine whether input x should be added to or subtracted from y (i.e., whether x or −x should be added to y), based on the value of "s". Thus, Equation 4 may be implemented by executing the MSIGN instruction, followed by an addition function. Because the execution unit 302 may include an M-width (e.g., dual) data-processing pathway, the MSIGN instruction may operate on M (e.g., two) values of x (using M values of s) at the same time.

The MSIGN instruction may specify an input operand (X) and a sign operand (S). Alternatively, the MSIGN instruction may specify a plural set of input operands and a plural set of sign operands, as discussed above. For example, each input operand X may be a 32-bit value representing a concatenation of a first operand value X0 and a second operand value X1. Each of the first operand value X0 and the second operand value X1 may be a 16-bit signed integer value. Each sign operand S may be a value representing a concatenation of a first sign function S0 and a second sign function S1. Each sign function may be represented by a 1-bit value, a 2-bit value, a 16-bit value, or may be represented in some other form, as discussed above. It should be understood that the input operand X may include more or less operand values, and the sign operand S may include more ore less sign functions, in embodiments including a different number of operational modules in each operational stage (e.g., if M≠2). The input operand X and the sign operand S may be specified directly, or may be specified by specifying the respective memory locations at which the input operand X and the sign operand S are located.

As illustrated, an input operand (X) is specified as being located at index "i" of an array LLR[ ] in memory, and a sign operand (S) is specified as being located at index "k" of an array S[ ] in memory. In such an implementation, the processing element 300 may sequence through a set of X values stored sequentially in memory and a set of S values stored sequentially in memory, merely by incrementing the "i" and "k" indices. For example, the processing element 300 may increment the "i" and "k" indices so as to receive a respective input operand X and a respective sign operand S, e.g., each clock cycle. The MSIGN instruction may further specify a memory location at which a result value (Z) may be stored. For example, Z may be a 32-bit value representing a concatenation of a first result value Z0 and a second result value Z1. It should be understood that the result value Z may include more or less component result values in embodiments including a different number of operational modules in each operational stage (e.g., if M≠2).

As illustrated, the select module 406A may be configured to provide the first operand value X0 and the first sign function S0 to the first operational module 408A, and to provide the second operand value X1 and the second sign function S1 to the second operational module 410A.

The operational module 408A may be configured to apply the first sign function S0 to the first operand value X0, to provide the first result value Z0. For example, the first sign function S0 may be applied to X0 according to either of the procedures for applying a sign function discussed above with regard to operational module 408C of the MAMIN-SUM function. The operational module 410A may be similarly configured to apply the second sign function S1 to the second operand value X1, to provide the second result value Z1.

The first and second result values Z0 and Z1 may be stored in the registers 412A, or may alternatively be stored to the memory outputs 306 (e.g., via the select module 414) or directly to another memory device, such as a neighboring DMR.

Thus, the first operational stage 404A may be configured to apply the first sign function S0 to the first operand value X0, and to apply the second sign function S1 to the second operand value X1. This may be performed, e.g., during a first clock cycle.

The first and second result values Z0 and Z1 may, in some embodiments, be stored in the memory outputs 306, and the combined result value Z may be output to another memory device, such as a neighboring DMR or a memory input register of another processing element. As illustrated, the result value Z is stored at index "l" of the array LLR[ ]. Thus, the processing element 300 may store a plural set of output values in sequential memory locations, merely by incrementing the "l" index.

Figure 7:
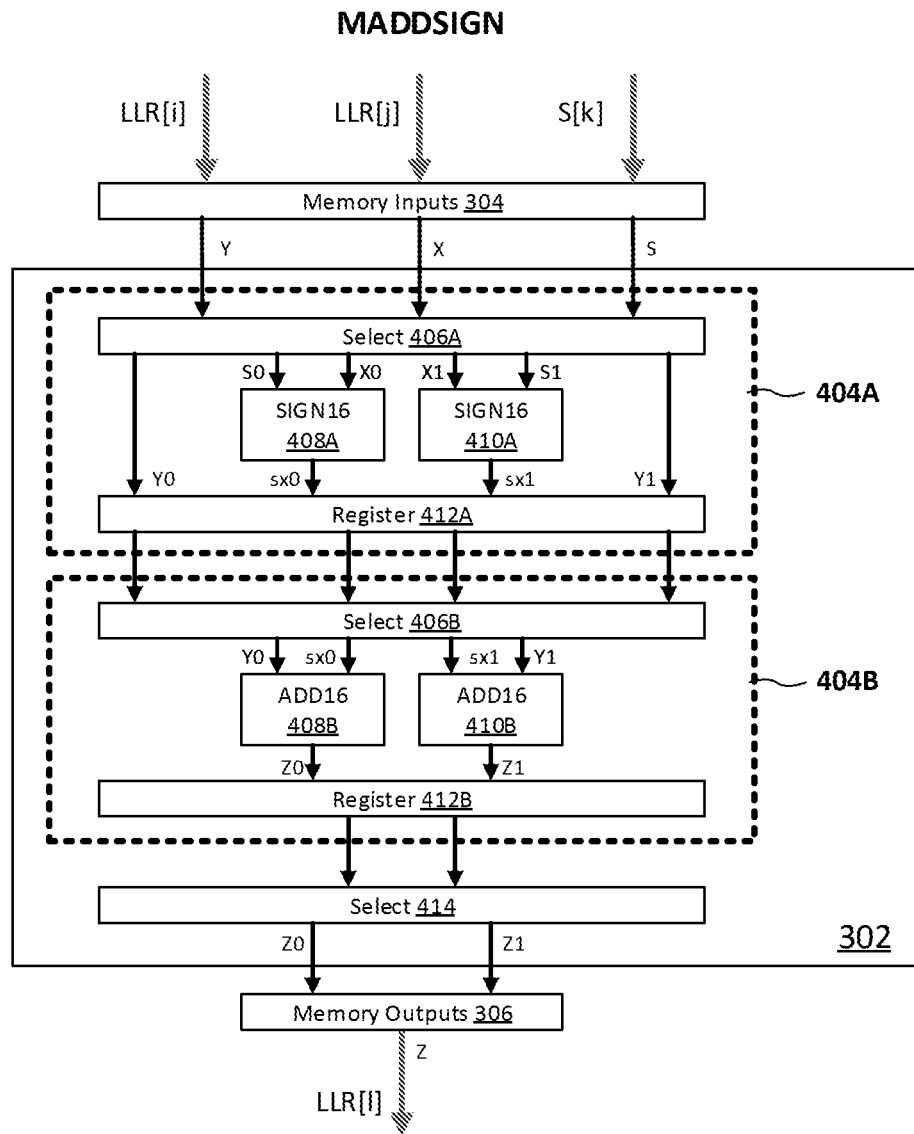
FIG. 7 illustrates a block diagram of the execution unit configured to execute an M-width add-sign instruction.

FIG. 7—Execution Unit Configured for MADDSIGN Instruction

FIG. 7 illustrates an example of the execution unit 302, configured to execute a MADDSIGN instruction, according to some embodiments. Using the MADDSIGN instruction, the execution unit 302 may implement M*N instances of Equation 2 (or Equation 4), with a latency of L clock cycles, and a throughput of M*N/(N+L−1) instances per clock cycle. As illustrated, the MADDSIGN instruction is implemented with a dual data-processing pathway (M=2), such that the execution unit 302 may implement 2N instances of Equation 2, with a latency of 2 clock cycles, and a throughput of 2N/(N+1) instances per clock cycle. It should be understood that the dual pathway embodiment is merely exemplary, and that other embodiments may include more or less operational modules in each operational stage to implement more or less instances of Equation 2 (e.g., if M≠2). It may be noted that, in a traditional RISC architecture, without the MADDSIGN instruction, a similar function may be performed with a latency of 4 clock cycles, and a throughput of ¼ instances per clock cycles. The processing element 300 may configure the execution unit 302 as shown in FIG. 7 in response to the processing element 300 receiving a MADDSIGN instruction.

The function of the MADDSIGN instruction may be viewed as the function of the MSIGN instruction, followed by an M-width (e.g., dual) addition function. Combining the MSIGN function and the M-width addition function into a single instruction may result in improved system performance, e.g., by reducing the number of instructions issued and the number of memory accesses performed. For example, the MADDSIGN allows the output of the MSIGN function to be stored in an internal register (e.g., 412A), and pipelined directly to a subsequent operational stage (e.g., operational stage 404B) to perform the addition function, rather than being written into remote memory, and then directed to a separate processing entity for addition.

Because the MADDSIGN instruction performs both the equivalent of the MSIGN function and a M-width addition function, the MADD SIGN instruction may specify an additional operand, relative to the MSIGN instruction. Specifically, the MADDSIGN instruction may specify a first input operand (X), a second input operand (Y), and a sign operand (S). Alternatively, the MADDSIGN instruction may specify a plural set of first input operands, a plural set of second input operands, and a plural set of sign operands, as discussed above. For example, each input operand X may be a 32-bit value representing a concatenation of a first operand value X0 and a second operand value X1. Each input operand Y may be a 32-bit value representing a concatenation of a third operand value Y0 and a fourth operand value Y1. Each of the first, second, third, and fourth operand values may be a 16-bit signed integer value. Each sign operand S may be a value representing a concatenation of a first sign function S0 and a second sign function S1. Each sign function may be represented by a 1-bit value, a 2-bit value, a 16-bit value, or may be represented in some other form, as discussed above. It should be understood that each of the first input operand X and the second input operand Y may include more or less operand values, and the sign operand S may include more or less sign functions, in embodiments including more or less operational modules in each operational stage (e.g., if M≠2). The first input operand X, the second input operand Y, and the sign operand S may be specified directly, or may be specified by specifying the respective memory locations at which the first input operand X, the second input operand Y, and the sign operand S are located.

As illustrated, the first input operand X is specified as being located at index "i" of an array LLR[ ] in memory, the second input operand Y is specified as being located at index "j" of the array LLR[ ], and the sign operand S is specified as being located at index "k" of an array S[ ] in memory. In such an implementation, the processing element 300 may sequence through a set of X values stored sequentially in memory, a set of Y values stored sequentially in memory, and a set of S values stored sequentially in memory, merely by incrementing the "i", "j", and "k" indices. For example, the processing element 300 may increment the "i", "j", and "k" indices so as to receive a respective first input operand X, a respective second input operand Y, and a respective sign operand S, e.g., each clock cycle. The MADDSIGN instruction may further specify a memory location at which a result value (Z) may be stored. For example, Z may be a 32-bit value representing a concatenation of a first result value Z0 and a second result value Z1. It should be understood that the result value Z may include more or less component result values in embodiments including a different number of operational modules in each operational stage (e.g., if M≠2).

As illustrated, the select module 406A may be configured to provide the first operand value X0 and the first sign function S0 to the first operational module 408A, and to provide the second operand value X1 and the second sign function S1 to the second operational module 410A. The select module 406A may be further configured to pass the third operand value Y0 and the fourth operand value Y1 directly to the register 412A, bypassing the operational modules.

The operational module 408A may be configured to determine a first signed value sx0 by applying the first sign function S0 to the first operand value X0. For example, the first sign function S0 may be applied to X0 according to either of the procedures for applying a sign function discussed above with regard to operational module 408C of the MAMINSUM function. The operational module 410A may be similarly configured to determine a second signed value sx1 by applying the second sign function S1 to the second operand value X1. The first and second signed values sx0 and sx1 may be stored in the register 412A.

Thus, the first operational stage 404A may be configured to determine the first signed value sx0 by applying the first sign function S0 to the first operand value X0, and determine the second signed value sx1 by applying the second sign function S1 to the second operand value X1. This may be performed, e.g., during a first clock cycle.

As illustrated, the select module 406B may be configured to provide the first signed value sx0 and the third operand value Y0 to the first operational module 408B, and to provide the second signed value sx1 and the fourth operand value Y1 to the second operational module 410B.

The operational module 408B may be configured to perform an addition function on the first signed value sx0 and the third operand value Y0, to produce the first result value Z0. For example, the addition function may include a 16-bit signed integer addition function (Y0+sx0). In some scenarios, the addition function may include a saturation function, as described above with regard to Equation 2, such that the operational module 408B implements the function sat(Y0+sx0). The maximum and minimum saturation values may be provided by the MADDSIGN instruction, or may be provided in advance, or may be hardcoded.

The operational module 410B may be similarly configured to perform an addition function on the second signed value sx1 and the fourth operand value Y1, to produce the second result value Z1. For example, the addition function may include a 16-bit signed integer addition function (Y0+sx0) or a saturated addition function sat(Y0+sx0).

The first and second result values Z0 and Z1 may be stored in the registers 412B, or may alternatively be stored to the memory outputs 306 (e.g., via the select module 414) or directly to another memory device, such as a neighboring DMR.

Thus, the second operational stage 404A may be configured to add the first signed value sx0 to the third operand value Y0, and add the second signed value sx1 to the fourth operand value Y1. This may be performed, e.g., during a first clock cycle.

The first and second output values Z0 and Z1 may, in some embodiments, be stored in the memory outputs 306, and the combined result value Z may be output to another memory device, such as a neighboring DMR or a memory input register of another processing element. As illustrated, the result value Z is stored at index "1" of the array LLR[ ]. Thus, the processing element 300 may store a plural set of result values in sequential memory locations, merely by incrementing the "1" index.

Figure 8:
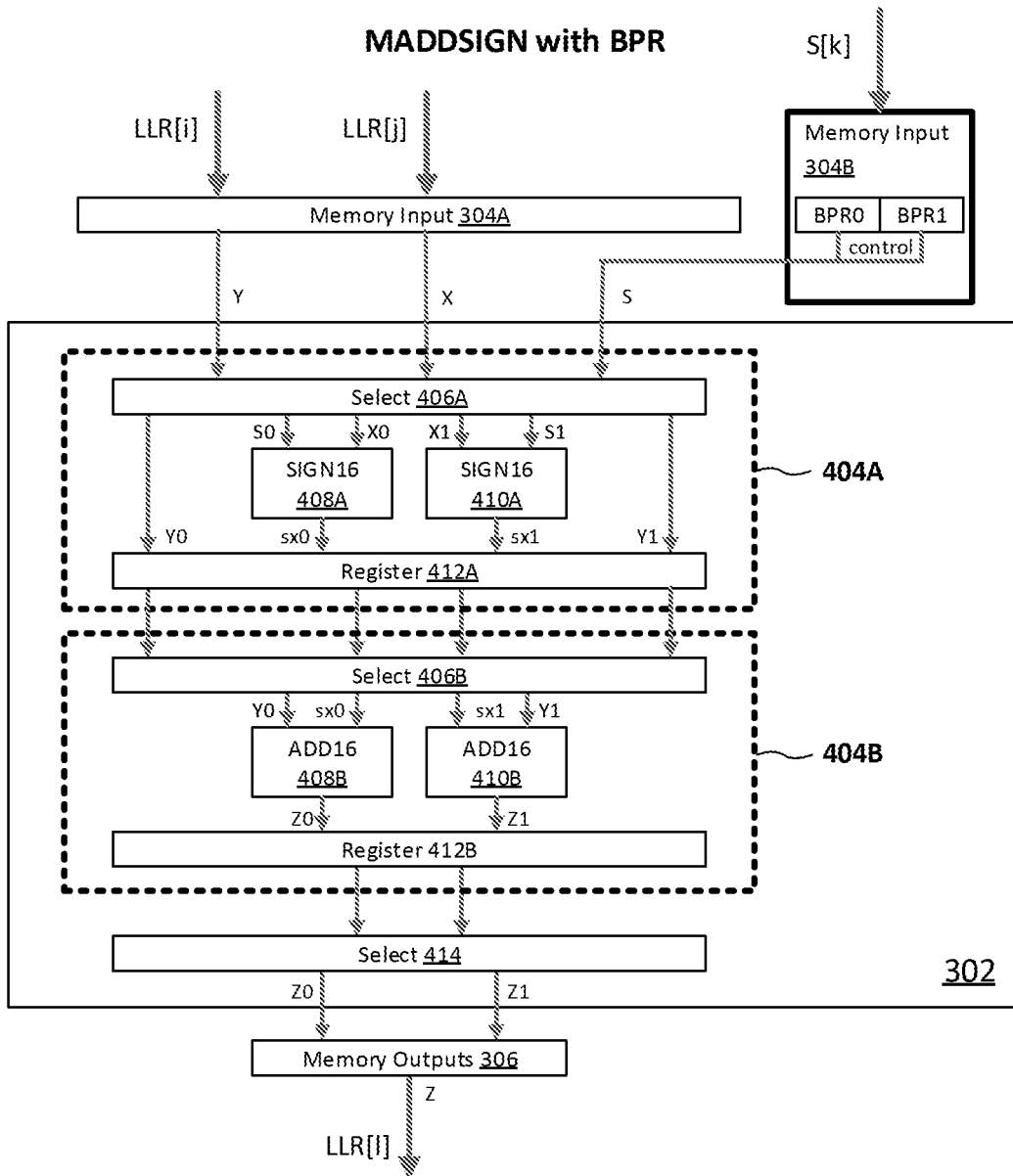
FIG. 8 illustrates a block diagram of the execution unit configured to execute an M-width add-sign instruction using one or more bit-packed registers.

FIG. 8—Execution Unit Configured for MADDSIGN Instruction

FIG. 8 illustrates an example of the execution unit 302, configured to execute a MADDSIGN instruction using one or more bit-packed registers (BPRs), according to some embodiments. Each of the operational stages 404A-B may be configured in the same manner as illustrated in FIG. 7. However, in some embodiments the processing element 300 may support receiving only two input values at a time (e.g., two 32-bit input values per clock cycle). This may prevent operation of the MADDSIGN instruction as illustrated in FIG. 7, as that instruction utilizes two input operands (e.g., two 32-bit input values), plus a sign operand.

To overcome this limitation, the memory input 304B may include one or more BPRs, which may be pre-loaded with one or more sign operands. For example, as discussed above, the MADDSIGN instruction may specify a plural set of first input operands, a plural set of second input operands, and a plural set of sign operands. Specifically, the MADDSIGN instruction may specify a respective starting address in one or more arrays in memory at which each of these plural sets begins. Additionally, as discussed above, the MADDSIGN instruction may specify the size of each of the plural sets (e.g., by expressly specifying the number of operands in one or more set, or by specifying a number of times to repeat the function and/or an ending memory location of one or more set).

In response to receiving the MADDSIGN instruction, the processing element 300 may load the plural set of sign operands into the one or more BPRs. Alternatively, the processing element may load a subset of the plural set of sign operands into the one or more BPRs, e.g., as constrained by the size of the BPRs, the input lines, and/or the sign operands. In some embodiments, this preloading may occur in a single clock cycle. For example, if the memory input 304B includes a 32-bit BPR, and if each sign operand S is a 2-bit operand (e.g., a concatenation of two 1-bit sign functions S0 and S1), then the BPR may be loaded in a single clock cycle with 16 sign operands, corresponding to the first 16 pairs of input operands. For example, the BPR may be loaded with the 32 bits located at (or beginning at) the memory location specified for the plural set of sign operands by the MADDSIGN instruction. Thus, the processing element 300 may perform 16 consecutive MADDSIGN functions without receiving further sign operands S from any external source. Therefore, 16 MADDSIGN functions may be performed, e.g., during consecutive clock cycles, even though the processing element 300 may receive only two input operands per clock cycle.

During operation of a MADDSIGN function, the BPR may provide a sign operand S to the select module 406A. For example, where the sign operand S is a 2-bit value, the BPR may provide its lowest two bits to the select module 406A. On the next clock cycle, the BPR may right-shift its contents, such that the previous lowest two bits are removed, and the next two bits are provided as a next sign operand S. This may be repeated, e.g. each clock cycle, until each of the preloaded values of sign operands S have been used. At that time, if additional MADDSIGN functions are to be performed according to the MADDSIGN instruction, operation of the operational stages 404 may pause, while the BPR loads the next subset of the plural set of sign operands S. This cycle may be repeated until the entire plural set of sign operands (and the plural sets of first input operands and second input operands) have been used.

Embodiments of the present disclosure may be realized in any of various forms. For example, in some embodiments, the present invention may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Other embodiments may be implemented according to the following paragraphs:

A processing element, comprising:
a plurality of pipelined operational stages, each operational stage configurable to perform a plurality of data-processing operations;
wherein the processing element is configured to, in response to receiving a first instruction:
receive a first input operand comprising a first operand value and a second operand value;
receive a second input operand comprising a third operand value and a fourth operand value;
configure a first operational stage to determine a first signed value by applying a first sign function to the first operand value, and determine a second signed value by applying a second sign function to the second operand value; and
configure a second operational stage to add the first signed value to the third operand value, and add the second signed value to the fourth operand value.

The processing element described above, wherein:
the first operational stage is configured to determine the first signed value and the second signed value during a first clock cycle; and
the second operational stage is configured to add the first signed value to the third operand value, and add the second signed value to the fourth operand value during a second clock cycle.

The processing element described above, further configured to, in response to receiving the first instruction, sequentially process a plurality of pairs of input operands, wherein the first input operand and the second input operand constitute a first pair of the plurality of pairs of input operands;
wherein the first operational stage is configured to find a respective first signed value and a respective second signed value based on the respective pair of input operands during each clock cycle of a plurality of consecutive clock cycles.

The processing element described above, further configured to, in response to receiving a second, different instruction, configure at least one operational stage to perform a plurality of data-processing operations other than those configured in response to receiving the first instruction.

The processing element described above, wherein the plurality of pipelined operational stages comprises a first plurality of pipelined operational stages, the processing element further comprising:
a second plurality of pipelined operational stages, wherein the second plurality of pipelined operational stages are configured in the same manner as the first plurality of pipelined operational stages.

The processing element described above, wherein configuring an operational stage comprises selecting a plurality of data-processing operations to be performed by the operational stage, and selecting registers from which inputs to the selected data-processing operations will be provided.

The processing element described above, wherein the first processing element further comprises a bit-packed register storing a plurality of sign functions comprising the first and second received sign functions, wherein the processing element is configured to load the plurality of sign functions into the bit-packed register prior to the first clock cycle.

What is claimed is:
1. A processing element, comprising:
a plurality of pipelined operational stages, each operational stage configurable to perform a plurality of data-processing operations;
wherein the processing element is configured to:
at a first time, in response to receiving an M-width approximated min-sum (MAMINSUM) instruction associated with a forward error correction (FEC) encoded signal, wherein the FEC encoded signal comprises a plurality of input values:
configure a first operational stage to determine an absolute value and a sign function of a first input value of the plurality of input values, and determine an absolute value and a sign function of a second input value of the plurality of input values;

configure a second operational stage to determine a minimum of the absolute value of the first input value and the absolute value of the second input value, and determine a final sign function comprising a product of the sign function of the first input value and the sign function of the second input value; and configure a third operational stage to apply the final sign function to the minimum of the absolute value of the first input value and the absolute value of the second input value; and iteratively perform the first, second, and third operational stages for the plurality of input values to generate a decoded signal corresponding to the FEC encoded signal; and at a second time, in response to receiving a different instruction, reconfigure at least one of the first, second, or third operational stages to perform a different function using a different plurality of input values.

2. The processing element of claim 1, wherein:

the first operational stage is configured to determine the absolute value and the sign function of the first input value, and determine the absolute value and the sign function of the second input value during a first clock cycle;

the second operational stage is configured to determine the minimum of the absolute value of the first input value and the absolute value of the second input value, and determine final sign function during a second clock cycle; and the third operational stage is configured to apply the final sign function to the minimum of the absolute value of the first input value and the absolute value of the second input value during a third clock cycle.

3. The processing element of claim 2, wherein the first input value and the second input value constitute a first pair of the plurality of pairs of input values, wherein to iteratively perform the first operational stage, the first operational stage is configured to determine an absolute value and a sign of each input value of a respective pair of input values during each clock cycle of a plurality of consecutive clock cycles.

4. The processing element of claim 1, wherein the plurality of pipelined operational stages is considered a first plurality of pipelined operational stages, the processing element further comprising:

a second plurality of pipelined operational stages, wherein the second plurality of pipelined operational stages are configured in the same manner as the first plurality of pipelined operational stages.

5. The processing elements of claim 1, wherein configuring an operational stage comprises selecting a plurality of data-processing operations to be performed by the operational stage, and selecting registers from which inputs to the selected data-processing operations will be provided.

6. A processing element, comprising:

a dual data-processing pathway configured to:

at a first time, execute a M-width add-sign instruction associated with a forward error correction (FEC) encoded signal, wherein the FEC encoded signal comprises a plurality of input values including a first input operand including a first operand value and a second operand value, and a second input operand including a third operand value and a fourth operand value, wherein, in executing the M-width add-sign instruction, the dual data-processing pathway is configured to:

configure a first operational stage to:

determine a first signed value by applying a first sign function to the first operand value; and determine a second signed value by applying a second sign function to the second operand value; and configure a second operational stage to:

add the first signed value to the third operand value; and add the second signed value to the fourth operand value;

and at a second time, in response to receiving a second, different instruction, reconfigure the dual data-processing pathway to perform a plurality of data-processing operations other than those configured in response to receiving the M-width add-sign instruction.

7. The processing element of claim 6, wherein the M-width add-sign instruction further specifies the first sign function and the second sign function.

8. The processing element of claim 6, wherein the M-width add-sign instruction specifies the first input operand by specifying a memory location at which the first input operand is located, and wherein the first instruction specifies the second input operand by specifying a memory location at which the second input operand is located.

9. The processing element of claim 6, wherein the M-width add-sign instruction further specifies a plural set of first input operands and a plural set of second input operands, wherein, in executing the first instruction, the processing element is configured to produce a plural set of result values for the plural set of first input operands and the plural set of second input operands.

10. The processing element of claim 9, further comprising a bit-packed register, wherein, in executing the M-width add-sign instruction, the processing element is configured to:

store, in the bit-packed register, a plural set of first sign functions corresponding to a plural set of first operand values of the plural set of first input operands; and store, in the bit-packed register, a plural set of second sign functions corresponding to a plural set of second operand values of the plural set of first input operands.

11. The processing element of claim 9, wherein the dual data-processing pathway is considered a first dual data-processing pathway, the processing element further comprising:

a second dual data-processing pathway, wherein the second dual data-processing pathway is configured in the same manner as the first dual data-processing pathway.

12. A processing element, comprising:

a dual data-processing pathway configured to:

at a first time, execute a M-width sign instruction that specifies an input operand including a first operand value and a second operand value, and a sign operand including a first sign function and a second sign function, wherein the input operand is one of a plurality of input operands associated with a forward error correction (FEC) encoded signal, wherein, in executing the first instruction, the dual data-processing pathway is configured to, for each respective input operand of the plurality of input operands:

configure a first operational stage to apply the first sign function to the first operand value; and configure a second operational stage to apply the second sign function to the second operand value; and at a second time, execute a different instruction to perform a plurality of data-processing operations other than those configured in response to receiving the M-width sign instruction.

13. The processing element of claim 12, wherein the M-width sign instruction specifies the input operand by specifying a memory location at which the input operand is located, and wherein the first instruction specifies the sign operand by specifying a memory location at which the sign operand is located.

14. The processing element of claim 12, wherein, in executing the M-width sign instruction, the processing element is configured to produce a plural set of result values for the plurality of input operands.

15. The processing element of claim 12, wherein the dual data-processing pathway is considered a first dual data-processing pathway, the processing element further comprising:

a second dual data-processing pathway, wherein the second dual data-processing pathway is configured in the same manner as the first dual data-processing pathway.

16. A signal processing device, comprising:

a memory medium comprising program instructions for performing forward error correction (FEC) using an M-width approximated min-sum instruction (MAMINSUM); and a processing element configured to execute the program instructions, wherein the processing element includes an M-width data-processing pathway, wherein the M-width data-processing pathway is configured by the program instructions to execute a MAMINSUM instruction, wherein the MAMINSUM instruction specifies a set of first input operands and a set of second input operands, wherein, in executing the MAMINSUM instruction, the M-width data-processing pathway is configured to:

on a first respective clock cycle of a plurality of clock cycles:
determine an absolute value of a first respective input operand of the first set of input operands;
determine a sign function of the first respective input operand;
determine an absolute value of a second respective input operand of the second set of input operands; and
determine a sign function of the second respective input operand;

on a second respective clock cycle of the plurality of clock cycles:
determine a respective minimum magnitude value comprising a minimum of the absolute value of the first respective input operand and the absolute value of the second respective input operand; and
determine a respective final sign function comprising a product of the sign function of the first respective input operand and the sign function of the second respective input operand; and on a third respective clock cycle of the plurality of clock cycles:
determine a respective output value by applying the respective final sign function to the respective minimum magnitude value; and
store the respective output value.

17. The signal processing device of claim 16, wherein the M-width data-processing pathway is further configured by the program instructions to execute a second instruction at a second time, wherein executing the second instruction comprises performing a different set of operations on further clock cycles of the plurality of clock cycles.

18. The signal processing device of claim 16, wherein the M-width data-processing pathway is further configured by the program instructions to execute the MAMINSUM instruction for the input operands of the set of first input operands and the set of second input operands, wherein a resulting set of output values are useable to determine a decoded forward error correction (FEC) signal.

19. The signal processing device of claim 18, wherein the set of first input operands and the set of second input operands are associated with an encoded FEC signal corresponding to the decoded FEC signal.

20. The signal processing device of claim 19, wherein the MAMINSUM instruction is executed with a latency of L clock cycles and a throughput of $(M/2)*N/(N+L-1)$ instances of MAMINSUM calculation per clock cycle.

* * * * *